(12) United States Patent
Arakawa et al.

(10) Patent No.: US 8,397,041 B2
(45) Date of Patent: *Mar. 12, 2013

(54) REMOTE COPY SYSTEM

(75) Inventors: Hiroshi Arakawa, Sagamihara (JP); Takashige Iwamura, Yokohama (JP); Kenta Ninose, Yokohama (JP); Yusuke Hirakawa, Odawara (JP)

(73) Assignee: Hitachi, Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/360,975

(22) Filed: Jan. 30, 2012

(65) Prior Publication Data
US 2012/0131298 A1 May 24, 2012

Related U.S. Application Data

(63) Continuation of application No. 12/957,457, filed on Dec. 1, 2010, now Pat. No. 8,131,963, which is a continuation of application No. 12/610,455, filed on Nov. 2, 2009, now Pat. No. 7,865,682, which is a continuation of application No. 10/954,163, filed on Oct. 1, 2004, now Pat. No. 7,634,626.

(30) Foreign Application Priority Data

Jul. 28, 2004 (JP) ................................. 2004-219483

(51) Int. Cl.
*G06F 12/00* (2006.01)
(52) U.S. Cl. ........................................ 711/162; 711/173
(58) Field of Classification Search .................... 711/162
See application file for complete search history.

(56) References Cited

U.S. PATENT DOCUMENTS

| | | | |
|---|---|---|---|
| 6,092,066 A | 7/2000 | Ofek | |
| 6,463,501 B1 | 10/2002 | Kern et al. | |
| 6,779,093 B1* | 8/2004 | Gupta | 711/162 |
| 6,981,008 B2 | 12/2005 | Tabuchi et al. | |
| 6,988,130 B2 | 1/2006 | Blumenau et al. | |
| 7,051,182 B2 | 5/2006 | Blumenau et al. | |
| 7,240,238 B2* | 7/2007 | Yanai et al. | 714/6.32 |
| 2001/0010070 A1* | 7/2001 | Crockett et al. | 711/162 |
| 2004/0078399 A1 | 4/2004 | Tabuchi et al. | |
| 2004/0078637 A1* | 4/2004 | Fellin et al. | 714/6 |
| 2011/0078397 A1 | 3/2011 | Arakawa et al. | |

FOREIGN PATENT DOCUMENTS

| | | |
|---|---|---|
| EP | 672985 | 9/1995 |
| EP | 1217523 | 6/2002 |
| EP | 1538527 | 6/2005 |

* cited by examiner

*Primary Examiner* — Tuan Thai
*Assistant Examiner* — Ngoc Dinh
(74) *Attorney, Agent, or Firm* — Brundidge & Stanger, P.C.

(57) ABSTRACT

Even when a host does not give a write time to write data, consistency can be kept among data stored in secondary storage systems. The present system has plural primary storage systems each having a source volume and plural secondary storage systems each having a target volume. Once data is received from a host, each of the plural storage systems creates write-data management information having sequential numbers and reference information and sends, to one of the primary storage systems, the data, sequential number and reference information. Each of the secondary storage systems records reference information corresponding to the larges sequential number among serial sequential numbers and stores, in a target volume in an order of sequential numbers, data corresponding to reference information having a value smaller than the reference information based on the smallest value reference information among reference information recorded in each of the plural secondary storage systems.

15 Claims, 9 Drawing Sheets

REMOTE COPY SYSTEM

CROSS-REFERENCES TO RELATED APPLICATIONS

The present application is a continuation of application Ser. No. 12/957,457, filed Dec. 1, 2010, now U.S. Pat. No. 8,131,963; which is a continuation application of Ser. No. 12/610,455, filed Nov. 2, 2009, now U.S. Pat. No. 7,865,682; which is a continuation application of Ser. No. 10/954,163, filed Oct. 1, 2004, now U.S. Pat. No. 7,634,626, which relates to and claims priority from Japanese Patent Application No. 2004-219483, filed on Jul. 28, 2004, the entire disclosures of which are incorporated herein by reference.

BACKGROUND OF THE INVENTION

The present invention relates to a storage system for storing data to be used by a computer and having data updated by a computer and more particularly to remote copy processing in which copies of data are held among plural storage systems.

EP 0672985 discloses a remote copy system for storing data to be used by a computer in a primary storage system and storing a copy of the data in a remote secondary storage system. In EP 0672985, copies of data are stored in the secondary storage system in the same writing order as that of storing the data in the primary storage system.

In EP 0672985, the primary storage system having received write data from a primary host computer reports the completion of reception of the write data to the primary host computer immediately after the reception of the write data. Then, the primary host computer reads a copy of the write data from the primary storage system. A write time is given to the write data. In this case, the write time is a time when a write request is issued for the write data. When the write data is loaded to the primary host computer, the write time is sent to the primary host computer. Furthermore, the primary host computer transfers the write data and the write time to a secondary host computer. The secondary host computer having received the write data and the write time writes the information including the write time in a control volume in the secondary storage system and writes respective write data in the secondary storage system in an order of write times with reference to write times given to the write data. By writing write data in the secondary storage system in an order of write times, the secondary storage system can always hold consistent data.

When write data is stored in the storage system in defiance of writing order, the end of a transaction cannot be identified in database processing, for example, which is a problem. In database processing, log data is first written in a storage system before data is written in the storage system. The log data includes information indicating the end of the transaction. Thus, when an error occurs before one transaction completes, a host computer can recover data to the state at the completion of the transaction with reference to the log data written in the storage system. However, when write data is stored in a storage system in defiance of writing order, data may be written in the storage system before the log data is written in the storage system. When an error occurs in the middle of a transaction under this condition, the host computer cannot process data having written until the middle of the transaction since the storage system does not hold the log data corresponding to the data. Thus, an in-progress result of the transaction remains in the storage system. Data having such an in-progress result of the transaction cannot be continuously used for sequent database processing.

As an example that an in-progress result of a transaction remains in a storage system, processing for transferring a deposit from Bank Account A to Bank Account B will be considered below. In this case, decreasing an amount in Account A and increasing an amount in Account B must be executed as one transaction. However, when an error occurs after increasing the amount of Account B (that is, after writing the balance after the increasing the amount of Account B) and before decreasing the amount of Account A (that is, before writing the balance after decreasing the amount of Account A), a period occurs in which the amount of the deposit in Account B is increased before the amount of deposit of Account A is decreased. In this case, when the log data is stored in a storage system thereof in advance, the host computer can recover data with reference to the log data. On the other hand, when the log data is not stored in a storage system thereof, the database processing cannot be recovered and inconsistent data remains in the storage system.

Similarly in a remote copy system, a failure may occur in a primary storage system and the primary storage system cannot be used after increasing the amount of Account B and before decreasing the deposit amount of Account A, an in-progress result of the transaction remains in a secondary storage system. In this case, when log data is not stored in the secondary storage system, improper processing is executed even though a secondary host computer takes over the transaction after that. Therefore, by holding consistent data in writing order, the validity of an order of related operations can be assured for related data thereof like the relationship between log data and data in database processing.

U.S. Pat. No. 6,092,066 discloses a technology by which data to be used by a computer is stored in a storage system and the storage system copies the data to another remote storage system so that the data can be held even when one storage system is unavailable due to a natural disaster or a fire.

SUMMARY OF THE INVENTION

According to EP 0672985, when write data received by a primary storage system from a host computer is reflected to secondary storage system, the write operations are performed in an order of write times given to the write data by the host computer. Therefore, when the host computer does not give write times to write data, the consistency of the write data stored in the secondary storage system cannot be kept. While a so-called mainframe host computer can give a write time to a write request, a so-called open-system host computer does not give a write time to a write request. Therefore, consistency cannot be kept for the write data from an open-system host computer according to the technology disclosed in EP 0672985.

U.S. Pat. No. 6,092,066 does not disclose the case that a host computer does not give a write time to write data, either.

Accordingly, a remote copy system implementing a technology for keeping consistency of data stored in a secondary storage system even when a host computer does not give a write time to write data is provided.

There is provided a remote copy system having plural primary storage systems each having a source logical volume in which data is written and plural secondary storage systems each having a target logical volume in which a copy of data stored in a respective source logical volume is written.

Once write data is received from a host computer, each of the plural storage systems creates write-data management information having sequential numbers based on an order of receiving write data for the received write data and reference information and sends, to one of the secondary storage systems, write-data, write-data information having write data and sequential numbers and reference information included in the write-data management information corresponding to the write data.

Each of the secondary storage systems having received write data and write-data information from the primary storage system records reference information included in write-data information having the largest sequential number among write-data information having serial sequential numbers. Each of the secondary storage systems stores, in the target logical volume in an order of sequential numbers, write data with write-data information including reference information having a value smaller than the reference information based on the smallest value reference information among reference information recorded in each of the secondary storage systems.

Thus, in the remote copy system, even when a host computer does not give a write time to write data, consistency can be kept among data stored in secondary storage systems.

DESCRIPTION OF THE PREFERRED EMBODIMENT

An embodiment of the invention will be described below. It should be understood that the invention is not limited by the embodiment described below.

Figure 1:
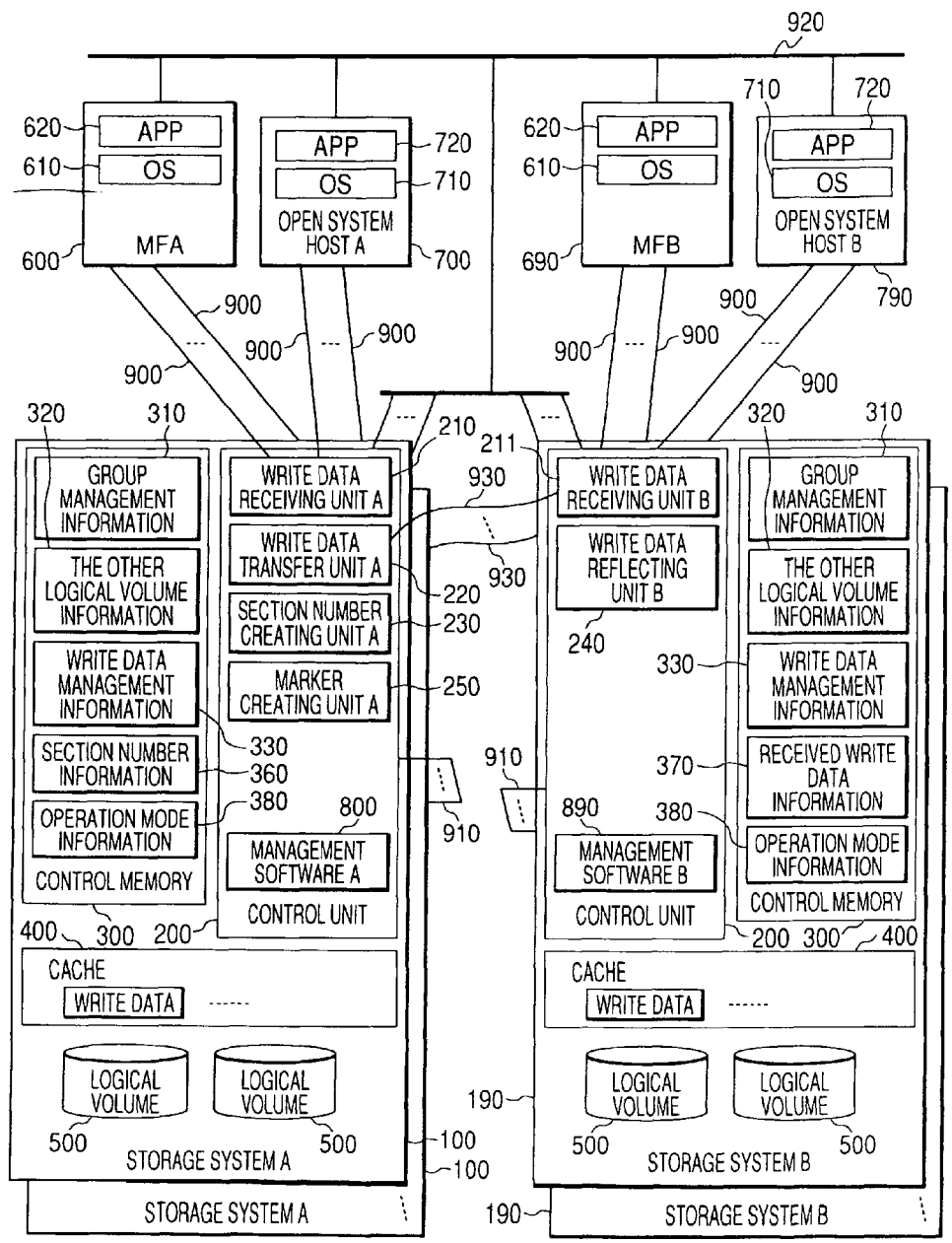
FIG. 1 is a diagram showing a configuration example of a computer system according to an embodiment.

FIG. 1 is a diagram showing a configuration example of a computer system according to an embodiment.

The computer system includes plural primary storage systems (also called primary storage systems) A-100, a main Frame host (MF) A-600, an open system host A-700, plural secondary storage systems (also called secondary storage systems) B-190, an MF B-690 and an open system host B-790.

The plural primary storage systems A-100, the MF A-600 and the open system host A-700 are connected through an I/O path 900. The plural secondary storage systems B-190, the MF B-690 and the open system host B-790 are similarly connected through an I/O path 900. The MF B-690 and the open system host B-790 are normally at a standby state. The MF A-600, MF B-690, the open system host A-700 and the open system host B-790 are also connected to a network 920.

Each of memories in the MF A-600 and MF B-690 stores an operating system (OS) 610 and application software (APP) 620, which are to be executed by processors of the MF A-600 and MF B-690. Each of memories in the open system host A-700 and open system host B-790 stores an OS 710 and APP 720, which are to be executed by processors of the open system host A-700 and open system host B-790. An I/O request issued from APP of the MF A-600, open system host A-700, MF B-690 or open system host B-790 through the OS is processed by the primary storage system A-100 or the secondary storage system B-190 through the I/O path 900. Here, the APP 620 and the APP 720 include software such as DBMS.

Each of the plural primary storage systems A-100 includes a control unit 200, a control memory 300, a cache 400 and one or plural disk devices. The control unit 200 includes a write-data receiving unit A-210, a write-data transfer unit A-220, a section-number creating unit A-230 and a marker creating unit A-250. Management software A-800 operates in the control unit 200 of one of the plural primary storage systems A-100. The management software A-800 is software stored in the control memory 300 and is executable by the control unit 200.

The control memory 300 stores group management information 310, the other volume information 320, write-data management information 330, section-number information 360, and operation-mode information 380, which are to be used in processing to be performed by the control unit 200. The processing will be described later The cache 400 is a high-speed memory mainly storing read data and/or write data. By using the cache 400, a high I/O processing performance can be achieved.

Desirably, the control unit 200, the control memory 300 and the cache memory 400 are duplexed for resistance to failures and usability, and a backup power source is prepared therefor.

The plural primary storage systems A-100 are connected to each other through a transfer path 910. Each of the primary storage systems A-100 is similarly connected to one or plural secondary storage systems B-190 through a transfer path 930. Furthermore, each of the primary storage systems A-100 is connected to the network 920.

Each of the secondary storage systems B-190 also includes a control unit 200, a control memory 300, a cache 400 and one or plural disk devices. The control unit 200 includes a write-data receiving unit B-211 and a write-data reflecting unit 240. Management software B-890 operates in the control unit 200 of one of the plural secondary storage systems B-190. The management software B-890 is software stored in the control memory 300 and is executable by the control unit 200.

The control memory 300 stores group management information 310, the other logical volume information 320, write-data management information 330, received write-data information 370 and operation-mode information 380, which are to be used by the control unit 200.

The cache 400 plays the same role as that of the primary storage system A-100.

The plural secondary storage systems B-190 are connected to each other through a transfer path 910. The secondary storage systems B-190 are also connected to the network 920.

Each of the primary storage systems A-100 and the secondary storage systems B-190 provides a logical volume 500 as a data storage area to the MF A-600, the open system host A-700, the MF B-690 or the open system host B-790. In this case, the logical volume 500 may be one or plural disk devices. One of the logical volumes 500 does not have to be physically one disk device and may be a set of storage areas distributed to plural magnetic disk devices, for example. The logical volume 500 may have a redundant construction such as a mirror construction and a RAID construction having parity data.

The logical volume 500 provided by the primary storage system A-100 to the MF A-600 is a different kind from that of the logical volume 500 provided to the open system host A-700. Logical and/or physical interfaces of the I/O path 900 for sending I/O requests from the host computer to the logical volume 500 are different between the MF A-600 and the open system host A-700. The same is true for the secondary storage system B-190, the MF B-690, and the open system host B-790. Especially, a write request from the MF A-600 or the MF B-690 includes a time of issuing the write request as a write time while a write request from the open system host A-700 or the open system host B-790 does not include a write time.

The plural primary storage systems A-100 and the plural secondary storage systems B-190 are connected through the transfer path 930 as described above. A copy of data stored in a logical volume of one of the primary storage system A-100 and the secondary storage system B-190 can be held in another logical volume of the other as described later. According to this embodiment, a copy of data stored in the logical volume 500 of the primary storage system A-100 is held in the logical volume 500 of the secondary storage system B-190. Information on data update performed on the logical volume 500 of the primary storage system A-100 is sent to the secondary storage system B-190 through the transfer path 930 and is also reflected to the corresponding logical volume 500 of the secondary storage system B-190. The primary storage system A-100 and the secondary storage system B-190 have the other logical volume information 320 indicating a correspondence between the logical volumes as described later and execute processing of copying data as described above by using the other logical volume information 320. Here, a logical volume of the primary storage system A-100 and a logical volume of the secondary storage system B-190 storing a copy of data stored in the logical volume of the primary storage system A-100 are paired. The other logical volume information 320 is defined in the primary storage system A-100 and the secondary storage system B-190 by a management terminal (not shown) connecting to the network 920 based on an input by a user.

Figure 2:
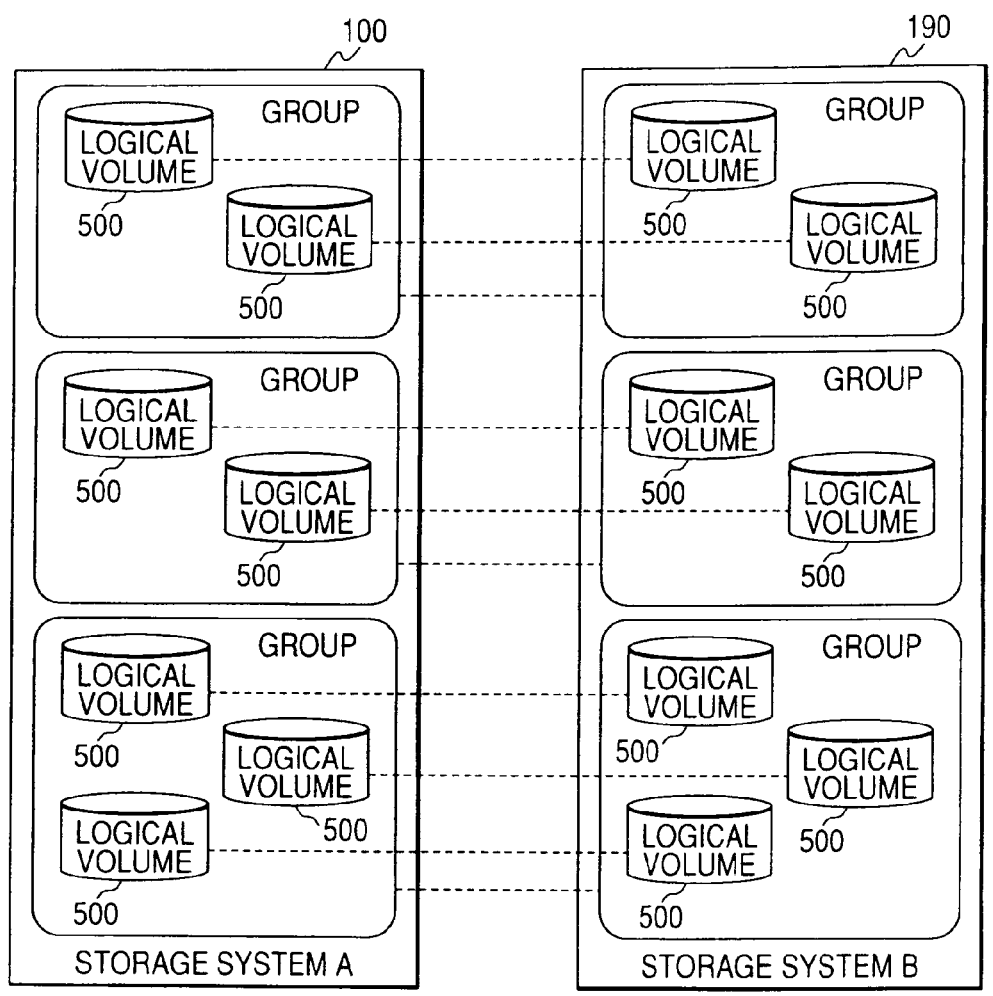
FIG. 2 is a diagram showing an example of pair-grouping.

According to this embodiment, plural pairs exist between the primary storage system A100 and the secondary storage system B-190, and the plural pairs are grouped. FIG. 2 shows a conceptual diagram showing an example of the grouped pairs.

In FIG. 2, the dashed-lines indicate correspondences between the logical volumes 500 or the groups. According to this embodiment, a writing order of write data received by the primary storage system A-100, transfer of write data from the primary storage system A-100 to the secondary storage system B-190 and processing of reflecting write data in the secondary Storage system B-190 are managed for each of the groups, and a resource required for these kinds of processing are assigned to each of the groups.

When these kinds of processing are performed for each of logical volumes, many targets must be managed, which may be complicated. Furthermore, because of many targets to be processed, resources required for those kinds of processing may increase. On the other hand, the entire plural logical volumes 500 in the primary storage system A-100 are grouped to one group, fine-grained management can not be performed. Especially, since requirements for performances of the logical volumes 500 are significantly different between a mainframe cost and an open system host, the logical volumes 500 for a mainframe host and open system must be separately grouped, and processing must be performed thereon separately such that the separate groups can be manipulated separately by a user for processing or a tuning condition can be defined separately therefor. Therefore, by grouping as described above, flexible copy processing and management can be achieved as required by users and/or operations.

While FIG. 2 schematically shows the case having one primary storage system A-100 and one primary storage system B-190, the same is true for a case having plural primary storage systems A-100 and plural secondary storage systems B-190. Each of the primary storage systems A-100 and the secondary storage systems B-190 holds group management information 310 in the control memory 300 for managing the above-described groups. The group management information 310 is defined in each storage system based on an input by a user through a management terminal (not shown) connecting to the network 920, like the above-described other logical volume information 320.

Next, write processing, transfer processing and reflection processing will be described. In the write processing, write data sent from the MF A-600 or the open system host A-700 to the logical volume 500 of the primary storage system A-100 is written in the primary storage system A-100. In the transfer processing, write data is transferred to the secondary storage system B-190. In the reflection processing, write data received by the secondary storage system B-190 is reflected in the secondary storage system B-190. Even when a host computer issues a write request to the primary storage System A-100 without giving a write time to the write request, these kinds of processing can hold consistency in write data in the plural secondary storage systems B-190.

Figure 3:
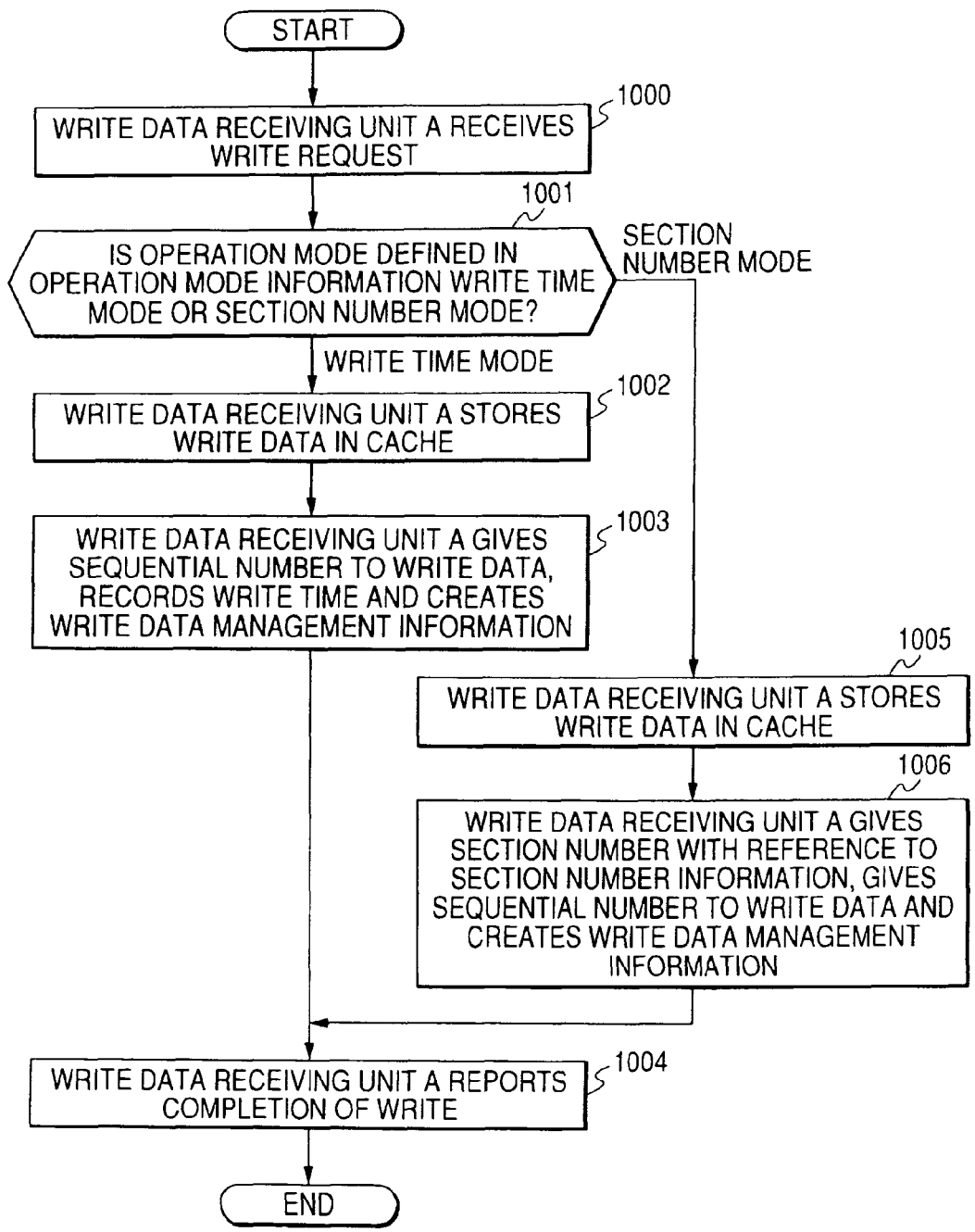
FIG. 3 is a diagram showing an example of processing by a write data receiving unit A of a primary storage system.

FIG. 3 is a diagram showing an example of processing for a case where the primary storage system A-100 receives a write request for a logical volume 500 (called source logical volume 500) having data to be copied by remote copy processing from the MF A-600 or the open system host A-700.

The write-data receiving unit A-210 of the primary storage system A-100 receives a write request from the MF A-600 or the open system host A-700 (step 1000). Next, the write-data receiving unit A-210 refers to the operation-mode information 380 stored in the control memory 300 (step 1001) and checks the defined operation mode.

Figure 4:
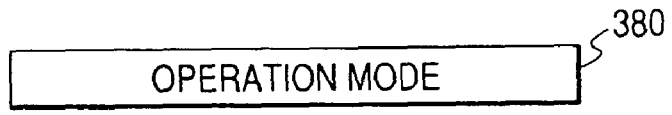
FIG. 4 is a diagram showing an example of operation mode information.

FIG. 4 is a diagram showing an example of the operation-mode information 380.

One of two operation modes of a section-number mode and a write-time mode is to be recorded as the operation mode information 380. A user or manager can define one of the operation modes in the primary storage system A-100 and the primary storage system B-190 through a management terminal (not shown) connecting to the network 920 or a management terminal included in the primary storage system A-100 or the primary storage system B-190.

The section-number mode is an operation mode suitable for a case where a write time may not be given to a write request issued from the host computer. Like this embodiment, the section-number mode is preferably defined as an operation mode in a system including the open system host A-700, which does not give a write time to a write request. The write-time mode is an operation mode suitable for a case where a write time is given to a write request issued from a host computer and is suitable for a case where the MF A-600 giving a write time to a write request only writes write data in the primary storage system A-100.

Referring back to FIG. 3, when the operation mode is the section-number mode, the write-data receiving unit A-210 stores write data in the cache 400 (step 1005) and creates write-data management information 330 by giving a section number and a sequential number to the write data (step 1006).

A section number is a number to be given with reference to the section-number information 360 stored in the control memory 300, the details of which will be described later. In order to give a sequential number, the write-data receiving unit A-210 refers to a sequential number registered with the group management information 310 of a group to which a logical volume subject to write processing belongs, records a value resulting from the addition of 1 to the registered sequential number as a sequential number of write data and records the new sequential number in the group management information 310 to update the sequential number recorded in the group management information 310.

Figure 5:
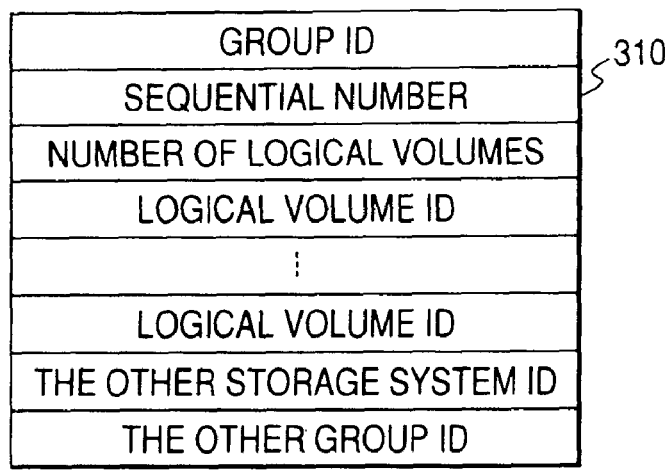
FIG. 5 is a diagram showing an example of group management information.

FIG. 5 is a diagram showing an example of the group management information 310 of each group.

A group ID is an ID for identifying a group in the primary storage system A-100 (or secondary storage system B-190). Sequential numbers are numbers to be serially given to write data to be written in the logical volume 500 belonging to this group, which is received by the primary storage system A-100 from a host computer. The initial value of the sequential number is zero (0), for example, and is sequentially incremented by one (1). At the step 1006 in FIG. 3, the write-data receiving unit A-210 gives a value resulting from the addition of one (1) to the sequential number to the write-data management information 330. The number of logical volumes is a number of logical volumes belonging to this group. The logical volume number is an ID for identifying a logical volume belonging to this group in the storage system A-100. The other storage system ID is an ID (such as a serial number) for identifying the copying secondary storage system B-190 paired with the primary storage system A-100. The other group ID is an ID for identifying a group to which the copying logical volume (called target logical volume) 500 belongs in the other storage system (destination secondary storage system B-190).

Figure 6:
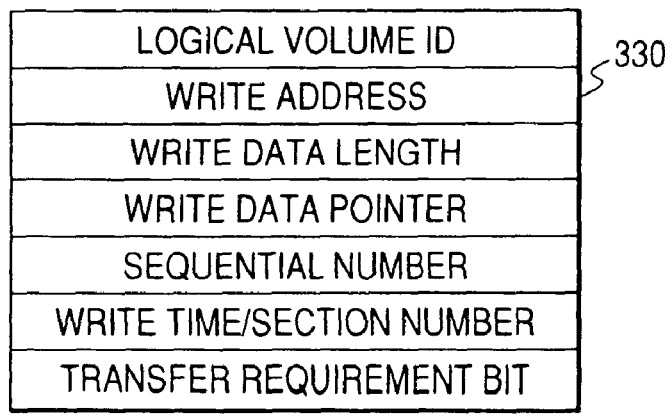
FIG. 6 is a diagram showing an example of write-data management information.

FIG. 6 is a diagram showing an example of the write-data management information 330 of each write data created by the step 1006 in FIG. 3.

The logical volume ID is an ID of the logical volume 500 in which write data is to be written. The write address is a write starting address of write data in a logical volume indicated by the given logical volume ID. A write data length is a length of the write data. The write-data pointer is a storage starting address of the write data in the cache 400.

The sequential numbers are numbers serially given to the write data in a group to which the logical volume 500 belongs in which the write data is to be written. The sequential number is a value resulting from the addition of one (1) to a value obtained by the write-data receiving unit A-210 from the group management information 310 at the step 1006 in FIG. 3 as described above. The transfer requirement bit is a bit indicating whether the write data must be transferred to the secondary storage system B-190 or not. The write-data receiving unit A-210 sets the transfer requiring bit to ON when the write-data receiving unit A210 receives the write data and creates write-data management information 330 (at the step 1006 and step 1003 in FIG. 3).

The write time given to a write request or a section number obtained from the section-number information 360 is recorded in the write time/section number field. In other words, when an operation mode is the section-number mode at the step 1001 in FIG. 3, the write time/section number field records a section number obtained by the write-data receiving unit A-210 based on the section-number information 360 at the step 1006. The write time/section number field records a write time received from a host computer along with write data, as described later, when the operation mode is the write-time mode at the step 1001 in FIG. 3. Adopting the same format for section numbers and write times can reduce the storage area for the write data-management information 330. Furthermore, as described later, partially common processing of reflecting write data in the secondary storage system B-190 can be performed between the two operation modes. The write-data management information 330 is managed in a list structure for each group, for example.

Referring back to FIG. 3, if the operation mode is the write-time mode at the step 1001, the write-data receiving unit A-210 stores write data in the cache 400 (step 1002), obtains a sequential number thereof in the same manner as that of the step 1006, and records a write time received from a host computer along with the obtained sequential number and the write data to create the write-data management information 330 (step 1003).

Finally, at the step 1004, the write-data receiving unit A-210 reports the write completion to the MF A-600 or the open system host A-700 (step 1004).

The processing shown in FIG. 3 excludes processing requiring time such as processing of writing write data stored in the cache 400 into a physical medium such as a magnetic disk device for the logical volume 500 and processing of transferring write data to the secondary storage system B-190. Those kinds of processing are performed later asynchronously in proper timing. Thus, the primary storage system A-100 can receive a write request and send a write completion report within a short time, and the primary storage system A-100 can quickly respond to the MF A-600 or the open system host A-700 therefore.

Figure 7:
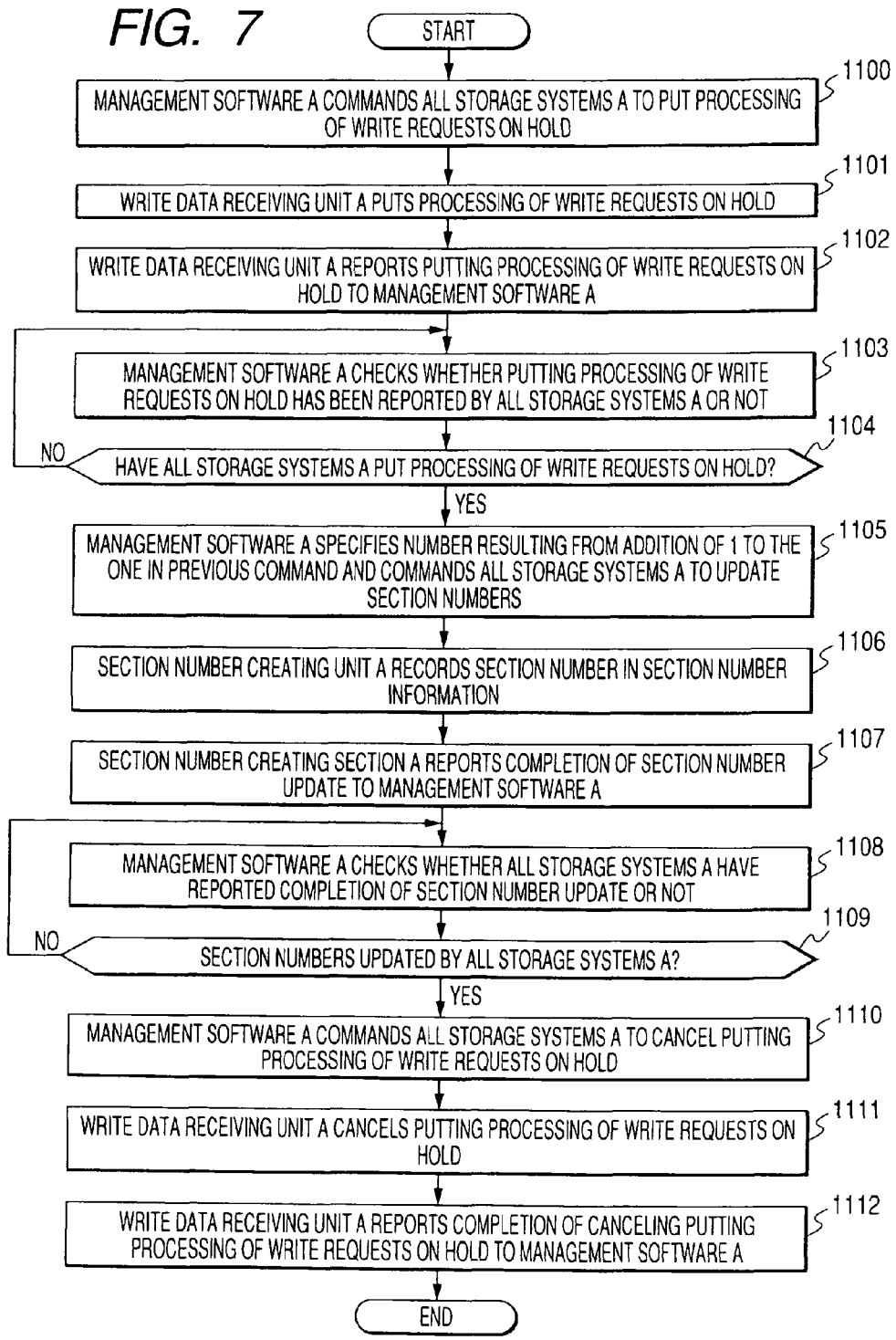
FIG. 7 is a diagram showing an example of processing of updating section numbers in a primary storage system.

FIG. 7 is a diagram showing an example of processing in a case where the management software A-800 operated in the control unit 200 commands the write-data receiving unit A-210 of the primary storage system A-100 to put the processing of a write request on hold and to update section numbers.

As described later, by implementing the processing shown in FIG. 7, write data having already undergone the write processing shown in FIG. 3 into the source logical volume 500 of the primary storage system A-100 when the processing is implemented can be synchronously reflected to the target logical volume 500 in the secondary storage system B-190. Thus, the consistency can be established among write data stored in the target logical volume 600 in the plural secondary storage systems B-190.

The management software A-800 in one of the plural primary storage systems A-100 first commands all of the primary storage systems A-100 to put processing of a write request on hold (step 1100). In response to the command, the write-data receiving unit A-210 of each of the primary storage systems A-100 puts the processing of write requests received from a host computer after the reception of the command by the step 1100 on hold (step 1101) and reports the fact that holding write requests has started to the management software A-800 (step 1102). Each of the primary storage systems A-100 may report to the management software A-800 not after putting processing of write requests on hold but upon reception of the command issued by the step 1100.

The management software A-800 checks whether all of the primary storage systems A-100 having received the command at the step 1100 have reported or not and then goes to next processing (steps 1103 and 1104).

Next, the management software A-800 commands all of the primary storage systems A-100 to update section numbers (step 1105). The command includes, as a parameter, a new section number, which is a value resulting from the addition of one (1) to a section number selected when the management software A-800 issues the command previously.

Figure 8:
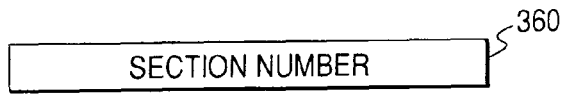
FIG. 8 is a diagram showing an example of section number information.

In response to the command issued by the management software A-800 at the step 1105, the section-number creating unit A-230 of each of the primary storage systems A-100 records the received section number in the section-number information 360 shown in FIG. 8 (step 1106). Then, the section-number creating unit A-230 reports the completion of the section-number update to the management software A-800 (step 1107).

FIG. 8 is a diagram showing an example of the section-number information 360 stored in the control memory of the primary-storage system A-100. Each of the primary storage systems A-100 stores the section number included in the section-number update command received from the management software A-800 at the step 1105 in FIG. 7 in the control memory as the section-number information 360. Every time the section-number creating unit A-230 receives the section-number update command, the section-number creating unit A-230 update the section number stored as the section-number information 360 (step 1106 in FIG. 7).

Referring back to FIG. 7, the management software A-800 checks whether all of the primary storage systems A-100 having received the section-number update command at the step 1005 have reported or not and goes to the next processing (steps 1108 and 1109).

The management software A-800 commands all of the primary storage systems A-100 to cancel the holding of processing of write requests (step 1110). In response to the command, the write data receiving unit A-210 of each of the primary storage systems A-100 cancels the holding of processing of write requests (step 1111) and reports the fact that the holding has been cancelled to the management software A-800 (step 1112).

Figure 13:
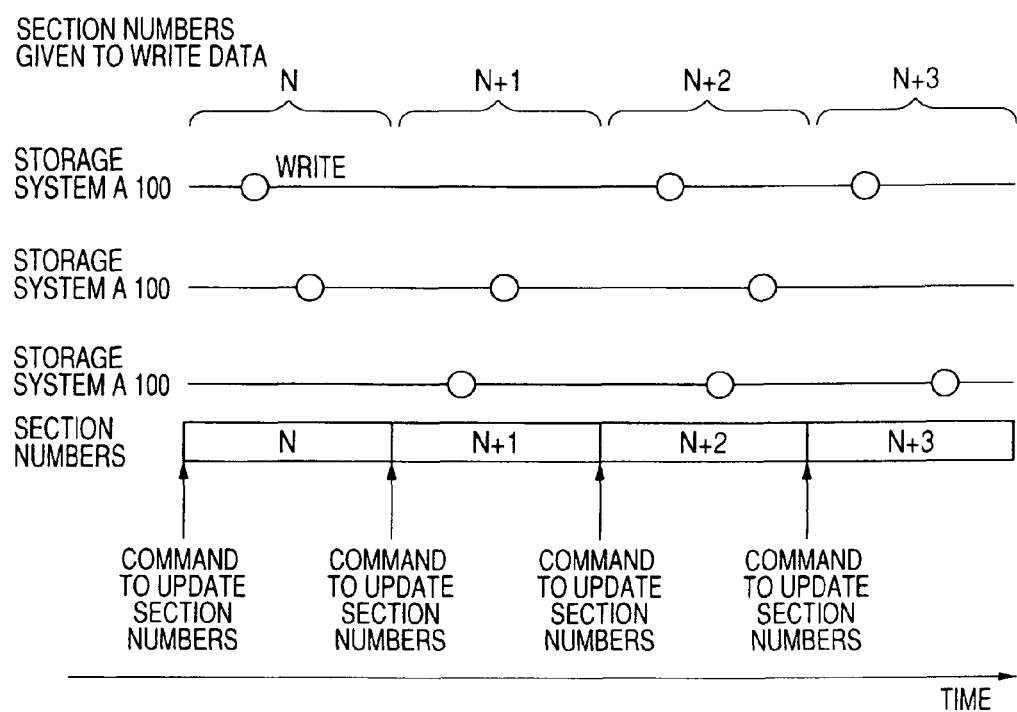
FIG. 13 is a diagram showing an example of a relationship between section numbers and write data.

FIG. 13 is a diagram showing an example of correspondences of section numbers and write data.

The horizontal axis indicates time, and every time the processing of updating section numbers shown in FIG. 7 is implemented, the value of the section number stored in each of the storage systems A-100 is incremented by one (1). As described with reference to FIG. 3, when the operation mode is the section-number mode, the section number held by each of the primary storage systems A-100 at the time of the reception of a write request (indicated by "0" in FIG. 13) received by each of the primary storage systems A-100 is given to write-data management information relating to write data subject to the write request.

Notably, when the operation mode is the write-time mode, the holding of processing of write requests and the processing of updating section numbers shown in FIG. 7 are not required. The two operation modes of the section-number mode and the write-time mode allow the implementation of processing as required only.

Figure 9:
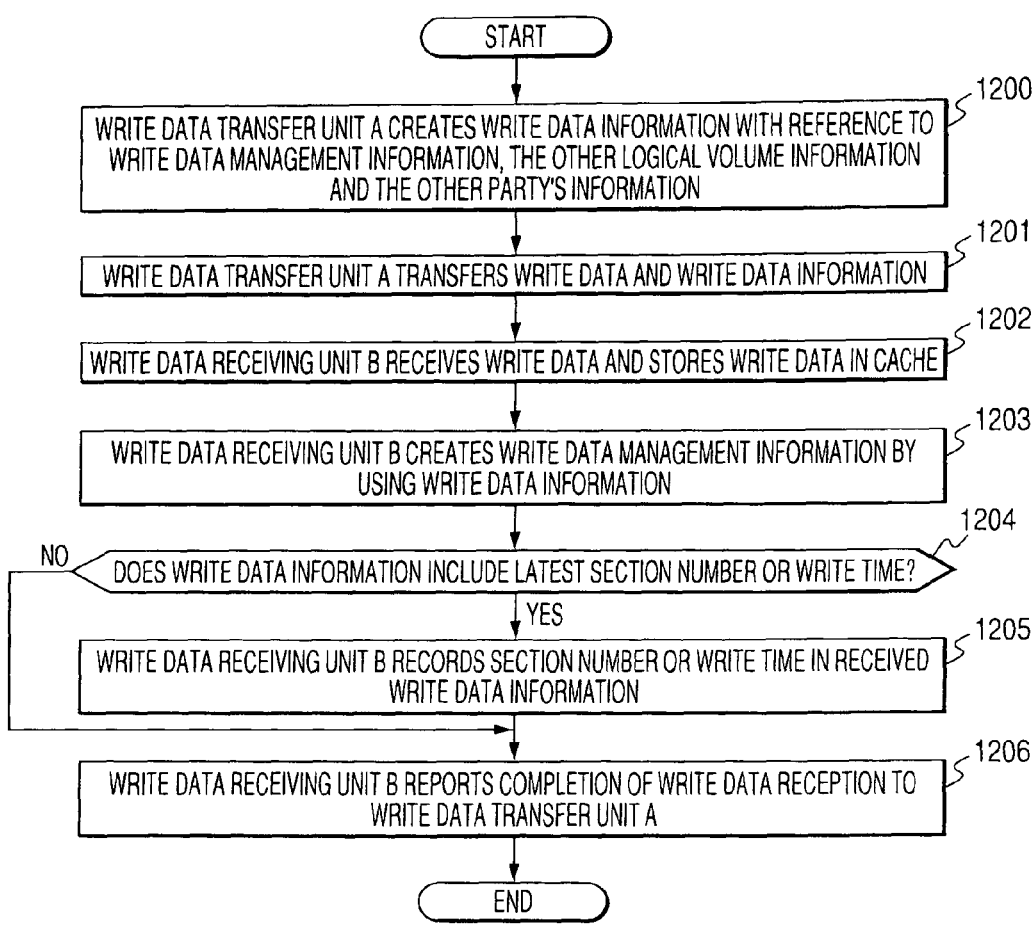
FIG. 9 is a diagram showing an example of processing of transferring write data from a primary storage system to a secondary storage system.

FIG. 9 is a diagram showing an example of processing of transferring write data from the primary storage system A-100 to the secondary storage system B-190. The write data transfer unit A-220 refers to a list of the write data management information 330 and obtains write data to transfer (that is, write data with write-data management information 330 having the transfer-requirement bit at ON). Then, the write-data transfer unit A-220 refers to the write-data management information 330, group management information 310 and the other logical volume information 320 and creates write-data information (step 1200).

The write-data information includes a write address, write data length, sequential number and section number or write time referred from the write-data management information 330, the other storage system ID and the other logical volume ID referred from the other logical volume information 320 and the other group ID referred from the group management information 310 by using a logical volume ID recorded in the write-data management information 330.

Figure 10:
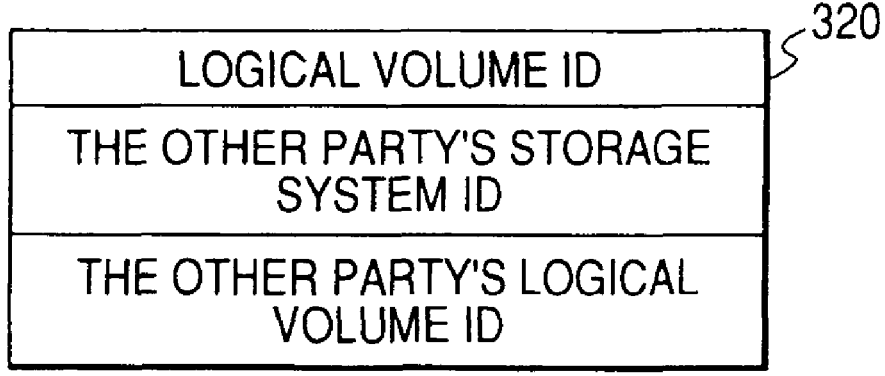
FIG. 10 is a diagram showing an example of the other logical volume information.

FIG. 10 is a diagram showing an example of the other logical volume information 320 of each logical volume.

The logical volume ID is an ID for identifying a source logical volume of the primary storage system A-100, and the other storage system ID is an ID (such as serial number) for identifying the secondary storage system B-190 having a target logical volume paired with the source logical volume. The other logical volume ID is an ID for identifying a target logical volume in the secondary storage system B-190.

Referring back to FIG. 9, the write-data transfer unit A-220 next transfers the write data identified at the step 1200 and the write-data information prepared at the step 1200 to the secondary storage system B-190 (step 1201).

The write-data receiving unit B-211 of the secondary storage system B-190 stores the received write data and write-data information in the cache 400 (step 1202) and creates write-data management information 330 from write-data information (step 1203). Items of the write-data management information 330 of the secondary storage system B-190 are the same as those of the write-data management information 330 of the primary storage system A-100 shown in FIG. 6. However, the write-data management information 330 stored in the control memory 300 of the secondary storage system B-190 is different from the write-data management information of the primary storage system A-100 in that a logical volume ID is an ID of the target logical volume 500, the write-data pointer is a storage starting address of write data in the cache 400 of the secondary storage system B-190, and the transfer requirement hit is always OFF. The other is the same.

The secondary storage system B-190 has the group management information 310 having the same items as those of the group management information 310 of the primary storage system A-100. However, the group ID of the group management information 310 of the secondary storage system B-190 is an ID for identifying a group to which the target logical volume 500 belongs. The other storage system ID is an ID of the primary storage system A-100 having the source logical volume 500 paired with the target logical volume 500. The other group ID is an ID for identifying a group to which the source logical volume 500 belongs in the primary storage system A-100 indicated by the other storage system ID.

Furthermore, the secondary storage system B-190 has the other logical volume information 320 having the same items as those of the primary storage system A-100 shown in FIG. 10. However, the logical volume ID is an ID for identifying the target logical volume 500. The other storage system ID is an ID for identifying a primary storage system to which the source logical volume 500 paired with the target logical volume 500 belongs. The other logical volume ID is an ID for identifying the source logical volume 500 in the primary storage system A-100 indicated by the other storage system ID.

Referring back to FIG. 9, the write-data receiving unit B211 next checks whether the section number or write time included in the received write-data information is the latest or not by a method, which will be described later, next (step 1204). If so, the write-data receiving unit B-211 records the section number or write time in the received write-data information 370 (step 1205).

Figure 11:
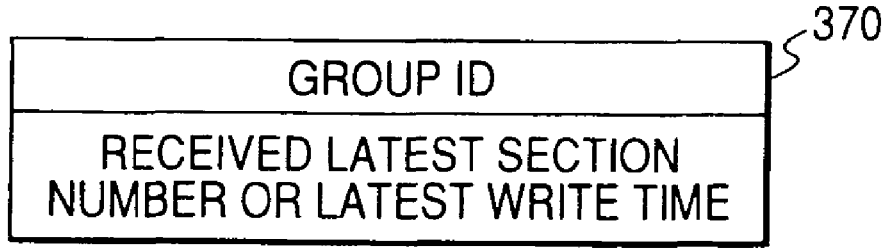
FIG. 11 is a diagram showing an example of received write-data information.

FIG. 11 is a diagram showing an example of the received write-data information 370 for each group.

The group ID is an ID for identifying a group in the secondary storage system B-190. The received latest section number or latest write time is the largest value among section numbers or write times of write-data information given to write data for the target logical volume 500 belonging to a group indicated by the group ID, which have been received by the write-data receiving unit B-211 of the secondary storage system B-190 up to that point. However, when some sequential numbers are missing in write-data information, the section number or write time included in write-data information having the largest sequential number among write-data information having serial sequential numbers is recorded as the received latest section number or latest write time.

Referring back to FIG. 9, at the step 1205, the write-data receiving unit B-211 compares the section number or write time held as the received write-data information 370 and the section number or write time included in the received write-data information. If the section number or write time included in the received write data information has a larger value, the write-data receiving unit B-211 updates the received write-data information 370 to the value.

However, when a part of write data has not been received with reference to sequential numbers included in write-data information (that is, when some sequential numbers are missing in the received write data information and a part of write data is missing), the section number or write time included in the write-data information received along with the last write data (write data immediately before missing write data) among write data having serial sequential numbers (that is, the section number or write time included in write-data information having the largest sequential number among write-data information having serial sequential numbers) and the value of the received write-data information 370 are compared. Then, the processing at the step 1205 is performed.

Notably, plural write data may be transferred in parallel between the write-data transfer unit A-220 and the write-data receiving unit B-211 by using plural links set between the primary storage system A-100 and the secondary storage system B-190. When the parallel transfer is performed, the write-data receiving unit B-211 may not always receive write data in an order of sequential numbers. However, since write data is reflected to each group in the secondary storage system B-190 in an order of sequential numbers as described later, write data is also written in the target volume 500 in the same order ins the write order for the source volume.

Finally, the write-data receiving unit B-211 reports the completion of write-data reception to the write-data transfer unit A-220 (step 1206). The write-data transfer unit A-220 having received the report of the write-data reception sets the transfer requirement bit of the write-data management information 330 at OFF for the write data corresponding to the completion report. When the transfer requirement bit of the write-data management information 330 is set to OFF, the write data can be discarded from the cache 400 in the primary storage system A-100 (that is, the storage area on the cache 400 storing the write data can be opened) on the condition that the source logical volume 500 of the primary storage system A-100 holds the write data.

Figure 12:
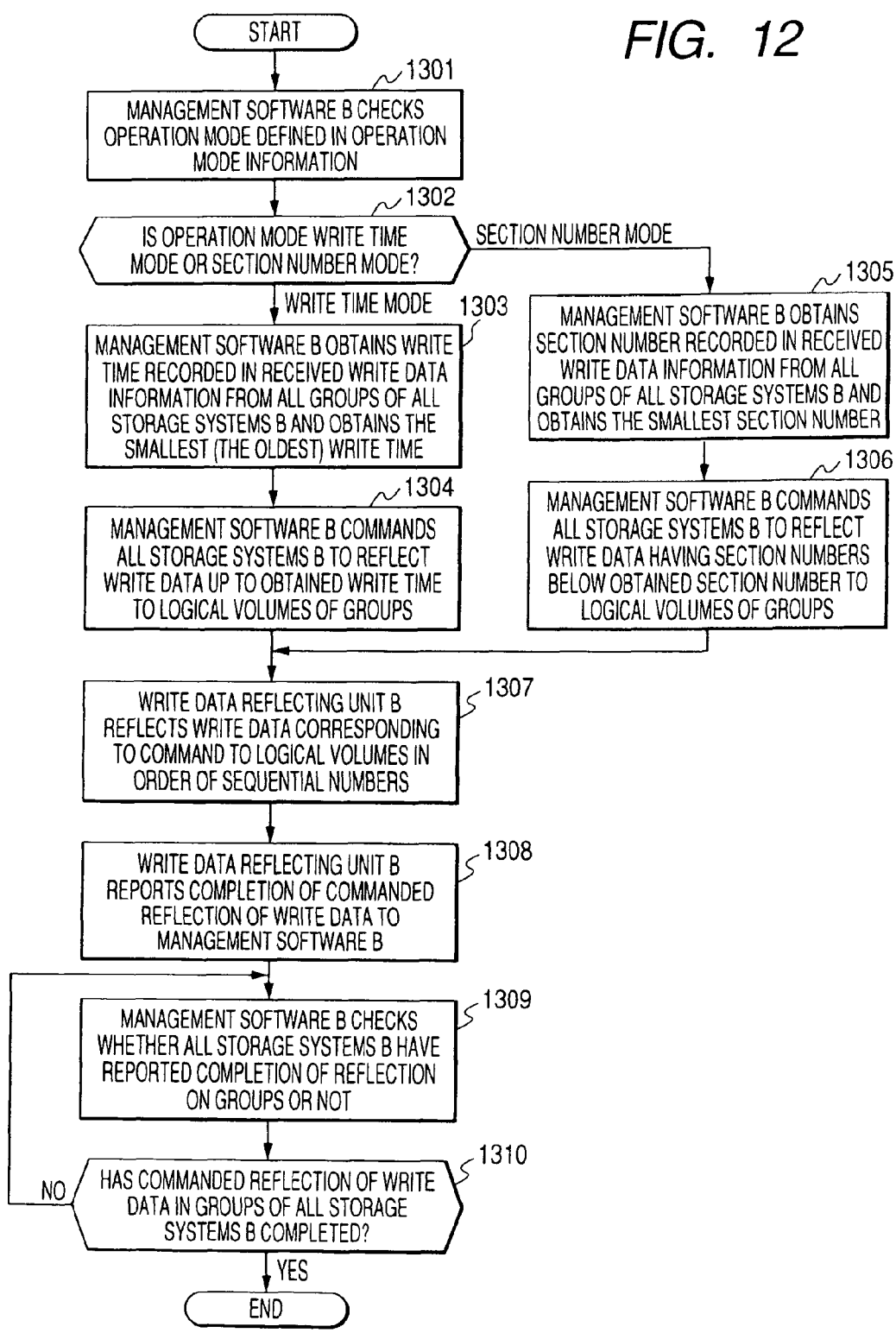
FIG. 12 is a diagram showing an example of processing of writing write data in a target volume of a secondary storage system.

FIG. 12 is a diagram showing an example of processing of reflecting write data to a target logical volume 500 in the secondary storage system B-190.

The management software B-890 in one of the plural secondary storage systems B-190 checks the operation mode first with reference to the operation mode information 380 stored in the control memory 300 of the secondary, storage system B-190 (step 1301).

If the defined operation mode is the section-number mode step 1302), the section numbers recorded in the received write-data information 370 for all groups are obtained from all of the secondary storage systems B-190. Then, the smallest section number among the obtained section numbers is obtained (step 1305). Next, the management software B-890 commands all of the secondary storage systems B-190 to reflect write data having the section numbers smaller than the section number obtained at the step 1305 in the write-data management information 330 to the target logical volume 500 (step 1306).

The details of the operation mode information 380 of the secondary storage system B-190 are basically the same as those of the operation mode information 380 of the primary storage system A-100. One of the two operation modes including the section-number mode and write-time mode is to be stored and is selected and defined by a user or an administrator.

If the operation mode is the write-time mode at the step 1302, the management software B-890 obtains write times recorded in the received write-data information 370 from all of the secondary storage systems B-190 for all groups therein. The management software B-890 obtains the smallest (that is, the oldest) write time among the obtained write times (step 1303). Next, the management software B-890 commands the secondary storage systems B-190 to reflect write data up to the write time obtained at the step 1303 to the target logical volume 500 (step 1304).

The write-data reflecting unit 240 of each of the secondary storage systems B-190 having received a command issued from the management software B-890 at the step 1304 or step 1306 refers to the write-data management information 330 and group management information 310 based on the command and writes the write data in the target logical volume 500 in an order of sequential numbers in each group (step 1307).

Then, once the write-data reflecting unit B-240 has completed the processing of writing the write data corresponding to the command issued at the step 1304 or step 1306 to the target logical volume 500, the write-data reflecting unit B-240 reports the completion of the reflection to the management software E-890 (step 1308).

The management software B-890 determines all of the secondary storage systems B-190 have reported the completion of normal reflection for the command issued at the step 1304 or step 1306 (step 1309 or step 1310) and finishes the reflection processing.

Since, in the processing shown in FIG. 12, the management software B-890 obtains the smallest section number or write time at the step 1305 or step 1303, all of the write data corresponding to the command issued at the step 1306 or step 1304 have already arrived at the corresponding plural secondary storage systems B-190. Therefore, the write data corresponding to the command issued at the step 1306 or step 1304 can be always written into the target logical volume 500. Therefore, when the operation mode is the section-number mode, write data having the section numbers up to the section number specified by the command at the step 1306 are always reflected to the target logical volumes 500 in the secondary storage systems B-190. When the operation mode is the write-time mode, write data having the write time up to the write time specified by the reflection command at the step 1304 are always reflected to the logical volumes in the secondary storage systems B-190. As a result, write data written in the primary storage systems A-100 up to a certain instant are reflected to the plural secondary storage systems B-190, and the consistency can be achieved among data stored in the target logical volumes.

As described above, when the format of the section numbers is the same as that of the write times, a common parameter format can be adopted for commands to refer to section numbers or write times, for example, and for commands to reflect. Furthermore, partially common reflection processing shown in FIG. 12 can be performed.

The management software A-800 and the management software B-890 repeat the above-described processing. Thus, an update to the source logical volume 500 in the primary storage system A-100 is regularly reflected to the target logical volume 500 in the secondary storage system B-190. Because of the above-described processing, the consistency among copies created in the plural primary storage systems A-100 and plural secondary storage systems B-190 can be always kept even when a host computer is included which does not give write times to write data. Therefore, the MF-B690 or open system host B-790 can take over the task by using consistent data stored in the secondary storage systems B-190.

The primary storage systems A-100 and the secondary storage systems B-190 do not have to be connected in a one-to-one relationship. When the logical volumes 500 and groups are paired and mapped as sources and targets, the same number of primary storage systems A-100 and secondary storage systems B-190 do not have to be provided.

In addition to the processing, based on a command from a user, for example, the marker creating unit A-250 of each of the primary storage systems A-100 may uniquely create special write data (called marker) only for write-data information excluding actual write data and give the updated section number or write time (that is, the section number or write time resulting from the addition of 1) to the marker. Then, after the primary storage system A-100 transfers a marker to the secondary storage system B-190, the transfer of write data may be terminated. In this case, the secondary storage system B-190 reflects write data before the received marker to the target logical volume 500 and terminates the reflection of write data. Thus, the remote copy processing by the primary storage system A-100 and secondary storage system B-190 can be terminated (which is called suspend state).

In this case, all of the write data before the suspend state are reflected to the target logical volumes in the secondary storage systems B-190. In the suspend state, the operation mode of the primary storage systems A-100 and/or secondary storage systems B-190 can be switched to same mode. The section-number information 360 and/or received write time information 370 are initialized when the operation mode is switched.

While, in the above-described processing, the transfer path 910 is used to exchange various commands and reports and/or information between the management software A-800 or management software B-890 and the primary storage system A-100 or secondary storage system B-190, the network 920 may be used. Furthermore, the logical volume 500, which is not subject to the holding of processing of write requests, maybe provided in the secondary storage system A-100, and a command to update a section number from the management software A-800 may be executed by sending a write request to the logical volume 500.

While, in the write data transfer processing described above, the write-data transfer unit A-220 transfers write data to the write-data receiving unit B-211 first, the write-data transfer unit B-211 may issue a request for transferring write data to the write-data transfer unit 220 first. Then, the write-data transfer unit A-220 having received the request may transfer the write data to the write-data transfer unit B-211. By using a write-data transfer request, the pace of write-data transfer can be adjusted in accordance with a state and/or load of processing and/or amount of stored write data in the secondary storage system B-190.

While, in the above-described processing, write data is stored in the cache 400, another logical volume 500 for storing write data may be prepared and write data may be stored in the logical volume 500 once. Since the logical volume 500 generally has a larger capacity than that of the cache 400, a more amount of write data can be stored.

The write time does not have to be in years, months, dates, hours, minutes, seconds, milliseconds, microseconds or nano seconds but may be sequential numbers.

While, in the description above, the management software A-800 exists in the storage system A-100 and the management software B-890 exists in the storage system B-190, the management software A-800 and the management software B-890 may be operated in one of the MF A-600, MF B-690, open system host A-700, open system host B-790, storage system A-100 and storage system B-190 when commands, reports and/or information can be exchanged through the transfer path 910 or the network 920. The management software A-800 and/or the management software B-890 may exist in another computer (such as a management terminal on the network 920), not shown, connecting to the storage system A-100 and the storage system B-190. When the storage system A-100 and the storage system B-190 controls the processing for achieving the consistency among target logical volumes as described above, the consistency among copies can be achieved only by processing by the storage system A-100 and the storage system B-190, which does not need to use resources on a host. A user or an administrator can select the storage system A-100 and/or the storage system B-190 in which the management software A-800 and/or the management software B-890 operates from the management terminal (not shown) connecting to the network 920 or a management terminal of each of the primary storage systems A-100 and secondary storage systems B-190.

A user or an administrator can further select or delete from the subjects the storage system A-100, storage system B-190 and/or a group therein to be processed by the management software A-800 and/or management software B-890 from a management terminal (not shown) connecting to the network 920 or a management terminal of each of the primary storage systems A-100 and secondary storage systems B-190.

The MF-A600, MF B-690, open system host A-700, open system host B-790 and other computers, not shown, can read and check, section numbers recorded in the section-number information 360 of the storage systems A-100, section numbers or write times recorded in the received write-data information 370 of the storage systems B-190.

What is claimed is:
1. A storage system connected to one or more host computers, comprising:
    a plurality of storage devices connected to the one or more host computers, wherein at least one of the plurality of storage devices comprises a first controller, wherein another one of the plurality of storage devices comprises a second controller, and wherein the plurality of storage devices comprises:

a control memory;

a cache memory that temporarily stores write data received from the one or more host computers; and one or more logical volumes that store the write data stored in the cache memory, wherein the first controller comprises:

an update command unit that commands an update of a section number stored in the control memory of the plurality of storage devices, and wherein the second controller comprises:

a write-data receiving unit that receives a write request and the write data from the one or more host computers, and stores the received write data in the cache memory, and generates write-data management information including a sequential-number and the updated section number stored in the control memory, the sequential number being based on an order of receiving the write data; and a section number generating unit that updates a value of the section number according to the update command for the section number, and stores the updated section number in the control memory, wherein the update command unit of the first controller issues a hold command to the second controller, wherein the write-data receiving unit of the second controller puts processing of the write request received from the one or more host computers on hold when the hold command is received, and reports completion of hold to the update command unit, wherein the update command unit of the first controller issues the update command for the section number to the second controller when the report of the completion of hold is received from the second controller, wherein the section number generating unit of the second controller updates the value of the section number to a value included in the update command when the update command is received, and reports completion of update to the update command unit, wherein the update command unit of the first controller issues a hold cancel command to the second controller when the report of the completion of update is received from the second controller, and wherein the write-data receiving unit of the second controller cancels the hold on the processing of the write request received from the one or more host computers when the hold cancel command is received.

2. The storage system according to claim 1, wherein the write-data receiving unit of the second controller generates the write-data management information including the sequential number and the updated section number stored in the control memory when the write data is received from the one or more host computers, after the hold on the processing of the write request is canceled.

3. The storage system according to claim 1, wherein the update command unit of the first controller issues the update command including a value of the section number incremented by 1 stored in the control memory, and wherein the section number generating unit of the second controller updates the value of the section number to the value of the section number incremented by 1 included in the update command.

4. The storage system according to claim 1, wherein the first controller further comprises:

a second write-data receiving unit that receives the write request and the write data from the one or more host computers, stores the received write data in the cache memory, and generates the write-data management information including the sequential number and the section number;

a second write-data transfer unit that generates write-data information associated with the write-data management information, and sends write data received at the another one of the plurality of storage devices, and the write-data information corresponding to the received write data, the write-data information including the sequential number and the section number; and a second section number generating unit that updates the value of the section number according to the update command for the section number, and stores the updated section number in the control memory, and wherein the update command unit of the first controller issues the hold command to the second write-data receiving unit, issues the update command to the second section number generating unit when the report of the completion of hold is received from the second write-data receiving unit, and issues the hold cancel command to the second write-data receiving unit when the report of the completion of update is received from a second update command unit.

5. A storage system connected to one or more host computers, comprising:

a plurality of primary storage devices connected to the one or more host computers;

a plurality of secondary storage devices each connected to at least one of the plurality of primary storage devices, wherein at least one of the plurality of primary storage devices comprises a first controller, wherein another one of the plurality of primary storage devices comprises a second controller, and wherein the plurality of primary storage devices comprises:

a control memory;

a cache memory that temporarily stores write data received from the one or more host computers; and one or more primary logical volumes that store the write data stored in the cache memory, wherein the first controller comprises:

an update command unit that commands an update of a section number stored in the control memory of the plurality of primary storage devices, wherein the second controller comprises:

a write-data receiving unit that receives a write request and the write data from the one or more host computers, and stores the received write data in the cache memory, and generates write-data management information including a sequential number and the updated section number stored in the control memory, the sequential number being based on an order of receiving the write data;

a write-data transfer unit that generates write-data information associated with the write-data management information, and sends the received write data and the write-data information corresponding to the received write data to at least one of the plurality of secondary storage devices, the write-data information including the sequential number and the section number; and a section number generating unit that updates a value of the section number according to the update command for the section number, and stores the updated section number in the control memory, wherein the update command unit of the first controller issues a hold command to the second controller, wherein the write-data receiving unit of the second controller puts processing of the write request received from the one or more host computers on hold when the hold command is received, and reports completion of hold to the update command unit, wherein the update command unit of the first controller issues the update command for the section number to the second controller when the report of the completion of hold is received from the second controller, wherein the section number generating unit of the second controller updates the value of the section number to a value included in the update command when the update command is received, and reports completion of update to the update command unit, wherein the update command unit of the first controller issues a hold cancel command to the second controller when the report of the completion of update is received from the second controller, and wherein the write-data receiving unit of the second controller cancels the hold on the processing of the write request received from the one or more host computers when the hold cancel command is received.

6. The storage system according to claim 5, wherein the write-data receiving unit of the second controller generates the write-data management information including the sequential number and the updated section number stored in the control memory the write data is received from the one or more host computers, after the hold on the processing of the write request is canceled.

7. The storage system according to claim 5, wherein the update command unit of the first controller issues the update command including a value of the section number incremented by 1 stored in the control memory, and wherein the section number generating unit of the second controller updates the value of the section number to the value of the section number incremented by 1 included in the update command.

8. The storage system according to claim 5, wherein the first controller further comprises:

a second write-data receiving unit that receives the write request and the write data from the one or more host computers, stores the received write data in the cache memory, and generates the write-data management information including the sequential number and the section number;

a second write-data transfer unit that generates the write-data information associated with the write-data management information, and sends the received write data and the write-data information corresponding to the received write data to the another one of the plurality of primary storage devices, the write-data information including the sequential number and the section number; and a second section number generating unit that updates the value of the section number according to the update command for the section number, and stores the updated section number in the control memory, and wherein the update command unit of the first controller issues the hold command to the second write-data receiving unit, issues the update command to the second section number generating unit when the report of the completion of hold is received from the second write-data receiving unit, and issues the hold cancel command to the second write-data receiving unit when the report of the completion of update is received from a second update command unit.

9. The storage system according to claim 5, wherein the plurality of secondary storage devices comprises:

a third controller;
a second control memory;
a second cache memory; and
one or more secondary logical volumes that store copy data of the one or more primary logical volumes of the primary storage device, wherein the third controller comprises:

the second write-data receiving unit that receives the write data and the write-data information from the write-data transfer unit of the primary storage device, stores the write data and the write-data information in the second cache memory, generates the write-data management information from the write-data information, and reports completion of reception to the write-data transfer unit, and wherein the write-data receiving unit compares the value of the section number stored in the second control memory, and the value of the section number included in the write-data information received from the write-data transfer unit, and updates the value of the section number stored in the second control memory to the value of the section number included in the write-data information received from the write-data transfer unit when the value of the section number included in the write-data information received from the write-data transfer unit, is greater than the value of the section number stored in the second control memory.

10. The storage system according to claim 9, wherein one of the third controller of the plurality of secondary storage devices comprises a reflection command unit that commands the third controller to reflect the write data received from the plurality of primary storage devices to the one or more secondary logical volumes, and wherein the one of the third controller of the plurality of secondary storage devices comprises a write-data reflecting unit that writes at least a part of the write-data information received from the write-data transfer unit to the one or more secondary logical volumes according to the reflection command, wherein the reflection command unit receives the section number stored in the second control memory from the third controller, identifies a smallest received section number value, and commands the write-data reflecting unit to reflect the write data corresponding to the write-data management information including a section number having a value smaller than the identified value, to the one or more secondary logical volumes, and wherein the write-data reflecting unit writes the write data corresponding to the write-data management information including the section number having the value smaller than the identified value, to the one or more secondary logical volumes in an order of the sequential number included in the write-data management information according to the reflection command.

11. The storage system according to claim 5, wherein the plurality of secondary storage devices comprises:

the third controller;
the second control memory;
the second cache memory; and the one or more secondary logical volumes that store the copy data of the one or more primary logical volumes of the primary storage device, wherein the third controller comprises:

the second write-data receiving unit that receives the write data and the write-data information from the write-data transfer unit of the primary storage device, stores the write data and the write-data information in the second cache memory, generates the write-data management information from the write-data information, and reports the completion of reception to the write-data transfer unit, wherein the second write-data receiving unit requests the write-data transfer unit of the primary storage device to transfer the write data, and wherein the write-data transfer unit of the primary storage device sends the write data and the write-data information to the second write-data receiving unit in response to the request.

12. A method for a storage system connected to one or more host computers, wherein the storage system comprises a plurality of storage devices connected to the one or more host computers, wherein at least one of the plurality of storage devices comprises a first controller, wherein another one of the plurality of storage devices comprises a second controller, and wherein the plurality of storage devices comprises:

a control memory;

a cache memory that temporarily stores write data received from the one or more host computers; and one or more logical volumes that store the write data stored in the cache memory, wherein the first controller comprises:

an update command until that commands an update of a section number stored in the control memory of the plurality of storage devices, and wherein the second controller comprises:

a write-data receiving a unit that receives a write request and the write data from the one or more host computers, and stores the received write data in the cache memory, and generate write-data management information including a sequential number and the updated section number stored in the control memory, the sequential number being based on an order of receiving the write data;

a section number generating until that updates a value of the section number according to the update command for the section number, and stores the updated number section in the control memory;

wherein the method comprises:

receiving the write request and the write data from the one or more host computers with the second controller;

storing the received write data in the cache memory with the second controller;

generating the write-data management information including the sequential number and the updated section number stored in the control memory, with the the sequential number being based on the order of receiving the write data;

issuing a hold command to the second controller from the update command unit of the first controller;

putting processing of the write request received from the one or more host computers on hold, with the second controller, when the hold command is received;

reporting completion of hold to the first controller from the second controller;

issuing the update command for the section number to the second controller from the update command unit of the first controller when the report of the completion of hold is received from the second controller;

updating the value of the section number to a value included in the update command by the section number generating unit of the second controller when the update command is received;

storing the updated section number in the control memory;

reporting completion of update to the update command unit of the first controller from the secton number generating unit of the second controller;

issuing a hold cancel command to the second controller from the update command unit of the first controller when the report of the completion of update is received from the second controller; and canceling the hold on the processing of the write request received from the one or more host computers, with the write-data receiving unit of the second controller, when the hold cancel command is received.

13. The method according to claim 12, further comprising:

generating the write-data management information including the sequential number and the updated section number stored in the control memory, with the write-data receiving unit of the second controller, when the write data is received from the one or more host computers, after the hold on the processing of the write request is canceled.

14. The method according to claim 12, further comprising:

issuing the update command including a value of the section number incremented by 1 stored in the control memory, with the update command unit of the first controller; and updating the value of the section number to the value of the section number incremented by 1 included in the update command, with the section number generating unit of the second controller.

15. The method according to claim 12, further comprising:

putting the processing of the write request received from the one or more host computers on hold when the hold command is issued from the update command unit of the fist controller;

updating the value of the section number to the value included in the update command when the update command is issued from the update command unit of the first controller; and canceling the hold on the processing of the write request received from the one or more host computers when the hold cancel command is issued from the update command unit of the first controller.

* * * * *